June 30, 1931. J. E. PFLUEGER Re. 18,117

COMBINED FISHHOOK AND WEED GUARD

Original Filed Jan. 6, 1925

Inventor.
J. E. Pflueger, deceased
The Enterprise Manufacturing Company
BY Ely Barrow
ATTORNEYS Reissued June 30, 1931

Re. 18,117

UNITED STATES PATENT OFFICE

JOSEPH E. PFLUEGER, DECEASED, LATE OF AKRON, OHIO, BY THE ENTERPRISE MANUFACTURING COMPANY, OF AKRON, OHIO, A CORPORATION OF OHIO, ASSIGNEE

COMBINED FISHHOOK AND WEED GUARD

Original No. 1,726,502, dated August 27, 1929, Serial No. 793, filed January 6, 1925. Application for reissue filed March 25, 1931. Serial No. 525,629.

This invention relates to fish hooks with which are combined light, flexible, resilient weed guard which project over the hook to prevent entanglement of the hook with weeds. Light flexible weed guards such as in common use are apt to bend or be distorted so as not to function properly and it is the object of the present invention to construct a weed guard which will be guided by the hook so as always to remain in proper relation thereto, and also to provide means for limiting the outward movement of the guard so that it cannot be bent outwardly from the hook.

It is also an object of the invention to combine a spinner or spoon or other lure upon the weed guard in the rear of the hook so as not to interfere with hooking the fish.

It is a further object of the invention to combine with a hook and a lure attached to the shank of the hook, a spinner or similar vibratory lure located rearwardly of the hook and mounted for free movement on the bent or curved portion of the hook. By mounting the spinner upon a member which is movable freely over the bend of the hook, the rotation of the spinner will guide the lure and hook in its passage through the water and will tend to maintain the point of the hook in upright position where it is more effective in catching the fish.

In the drawings is shown one embodiment of the invention, it being understood that changes and modifications may be made within the scope of the invention and the claims appended hereto.

Figure 1:
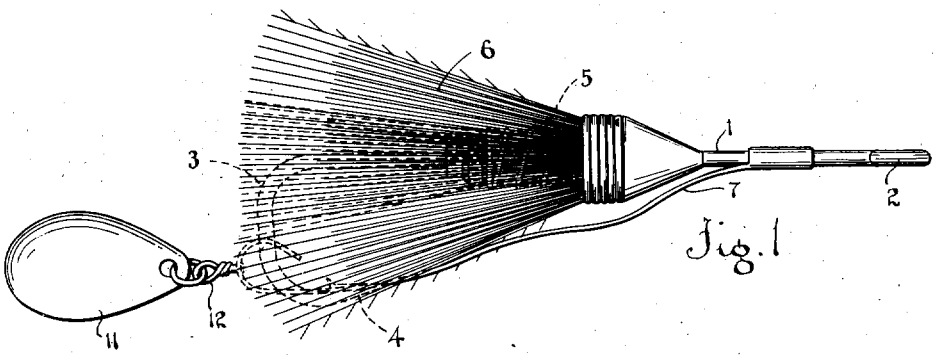
Figure 1 is a side view of the improved hook and weed guard.
Figure 2:
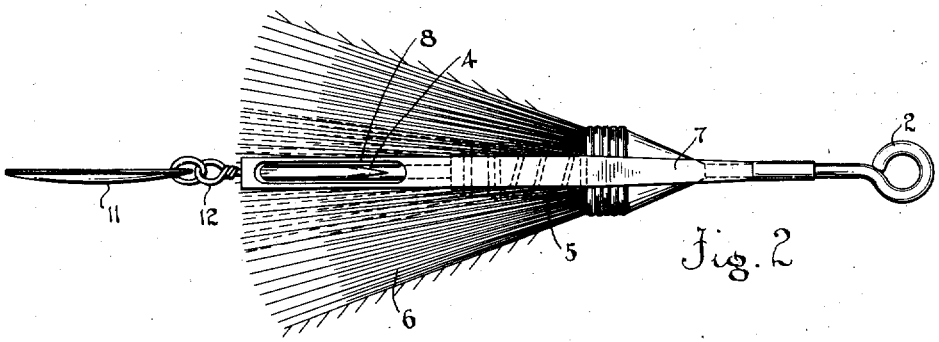
Figure 2 is a view looking down at the weed guard from above.
Figure 3:
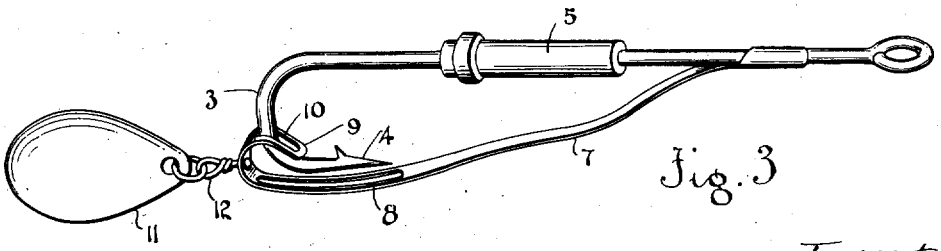
Figure 3 is a perspective view of the hook and weed guard.

The shank of the hook is indicated by the numeral 1, and the eye by the numeral 2. The curved portion of the hook is indicated by the numeral 3 and the barb or point by the numeral 4. On the shank of the hook is located the weight or body 5 and to the weight may be attached a lure 6, which in the present embodiment of the invention is in the form of a buck tail, although other lures or attractions may be utilized.

The weed guard is a light, flexible, resilient strip of spring metal which is attached to the shank of the hook and overlies the point. In the form of the invention illustrated a strip of flat metal 7 is attached to the shank above the weight and is bent outwardly slightly so as to overlie the hook, the portion of the guard over the hook being slotted as at 8, so as to permit movement of the guard inwardly, the hook passing through the slot and being exposed. The end of the guard is reversely bent as at 9, and is received over the curved portion 3 of the hook, a second slot 10 being provided for that purpose.

It will be observed that when the fish strikes the hook, the weed guard will yield readily to expose the hook and will not interfere with catching the fish. The slot 8 and also the slot 10 guide the weed guard and prevent its being bent out of shape. The return portion 9 of the guard will prevent its being bent outwardly away from the hook. The solid portion of the guard between the slots and in that portion of the guards, which extends beyond the hook, braces the weed guard so that it cannot be easily bent out of shape, and the slot 8 will register with the barbed portion of the hook.

If desired the weed guard may be provided with a spinner, spoon or other lure which is indicated by the numeral 11. This spoon is attached by the swivel 12 to the lower end of the weed guard below the hook and provides an additional lure for the hook. Being located beyond, or at the rear of the hook, it does not offer any obstruction to the hook.

The weed guard constitutes a carrier for the spinner which is slidable upon the bent portion of the hook so that the spinner is carried at the rear of the hook and is slidable freely thereon. As the spinner is normally above the body 5, it tends by rotation or vibration to keep the hook in upright position in its passage through the water. This is a very considerable advantage as the point of the hook is directed upwardly so that it will engage the roof of the mouth of the fish, and the lure is therefore more effective and certain in operation.

It will be observed that there has been provided a new and useful weed guard which is so constructed and designed that it cannot be bent or distorted but will always lie in its correct position with respect to the hook. The utilization of the weed guard as a carrier for the spinner or lure places that element at the rear where it cannot interfere with the hook.

These and other objects and advantages will be apparent to those skilled in the art and it is the intention to cover such features as broadly as is consistent with the prior art with a fair interpretation of the attached claims.

What is claimed is:

1. A fish hook, and a flexible weed guard for the hook, said weed guard having a hook guarding portion and a guiding portion rearwardly thereof and movable over the curved portion of the hook, and a lure attached to the guiding portion of the weed guard.

2. A fish hook, a flexible weed guard overlying the hook, means to guide the weed guard upon the hook, and a spinner carried by the weed guard in the rear of the hook.

3. A fish hook, a weed guard mounted thereon, said weed guard being formed from a light, flexible strip of metal, having a slot near its outer end to pass over the hook when the guard is depressed and also provided with a return bent portion having a second slot received over the curved portion of the hook, and a fish lure attached to the guard between the slots.

4. A fish hook, a weed guard mounted thereon, said weed guard extending outwardly beyond the limit of the hook and having a return bent portion which engages the curved portion of the hook, the return bent portion being provided with a slot through which the curved portion of the hook is movable and the main body of the guard having a slot through which the barbed portion of the hook is movable, and a solid portion in that part of the guard which extends beyond the limit of the hook.

5. In combination with a fish hook, a lure rigidly attached to the shank of the hook, the curved portion of the hook extending rearwardly of the lure, a spinner, and a carrier for the spinner slidably attached to the curved portion of the hook and designed to cause the hook and lure to ride with the point of the hook upwardly when in use.

6. A fish hook having a lure attached to the shank thereof, a member slidable over the curved portion of the hook, and a spinner swiveled to the member and carried rearwardly of the hook.

7. A bait of the character described comprising a lure body, a hook having a shank attached to and rigid with the body, a spinner, and a swivel for the spinner connecting the spinner with the bend of the hook and movable freely thereon, said spinner by reason of its free movement on the hook bend acting to so control the lure in use as to maintain the hook substantially upright.

8. A bait of the character described comprising a lure, a hook having a shank attached to the lure, a carrier slidable over the rear bent portion of the hook, and a spinner swiveled upon the carrier and operative by its action in the water to so control the hook as to maintain the point of the hook upright.

9. A bait comprising a hook, a carrier slidable over the bent portion of the hook, and a vibratory lure supported upon the carrier rearwardly of the hook and by its movement in the water to maintain the hook with its point directed upwardly.

10. A bait comprising a hook, a carrier slidable over the bent portion of the hook, and a spinner or the like supported upon the carrier and operable during use to maintain the point of the hook directed upwardly.

11. A bait comprising a hook, a lure body rigidly mounted on the shank of the hook, and a spinner or the like slidably mounted upon the hook bend.

12. A bait comprising a hook, a lure body rigidly mounted on the shank of the hook, and a spinner or the like slidably mounted and swiveled upon the hook bend.

JOSEPH E. PFLUEGER,
*Deceased,*
By THE ENTERPRISE MANUFACTURING COMPANY,
*His Assignee.*
ERNEST A. PFLUEGER,
*President.*